(12) United States Patent
Kim et al.

(10) Patent No.: US 12,066,147 B2
(45) Date of Patent: Aug. 20, 2024

(54) DISPLAY STAND

(71) Applicant: LG ELECTRONICS INC., Seoul (KR)

(72) Inventors: Sanghoon Kim, Seoul (KR); Chunho Byun, Gwangmyung-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/977,761

(22) Filed: Oct. 31, 2022

(65) Prior Publication Data
US 2023/0228374 A1    Jul. 20, 2023

(30) Foreign Application Priority Data
Jan. 20, 2022    (KR) .................. 10-2022-0008587

(51) Int. Cl.
*F16M 13/02* (2006.01)
*F16M 11/20* (2006.01)
*F16M 11/24* (2006.01)

(52) U.S. Cl.
CPC ...... *F16M 13/022* (2013.01); *F16M 11/2014* (2013.01); *F16M 11/24* (2013.01); *F16M 2200/022* (2013.01); *F16M 2200/027* (2013.01)

(58) Field of Classification Search
CPC .. F16M 13/022; F16M 11/2014; F16M 11/24; F16M 2200/022; F16M 2200/027
USPC ..................................................... 248/285.1
See application file for complete search history.

(56) References Cited

U.S. PATENT DOCUMENTS

| 7,389,963 | B2 * | 6/2008 | Cho ....................... F16M 11/28 |
| | | | 248/917 |
| 8,061,663 | B2 * | 11/2011 | Wang ................. F16M 11/2021 |
| | | | 248/176.1 |
| D969,794 | S  * | 11/2022 | Barbour, Jr. ................. D14/253 |
| D970,483 | S  * | 11/2022 | Mai ............................. D14/229 |

(Continued)

FOREIGN PATENT DOCUMENTS

| CN | 107588292 | 1/2018 |
| CN | 107588292 A * | 1/2018 |

(Continued)

OTHER PUBLICATIONS

European Patent Office Application Serial No. 22201788.1, Search Report dated May 31, 2023, 7 pages.

(Continued)

*Primary Examiner* — Muhammad Ijaz
(74) *Attorney, Agent, or Firm* — LEE, HONG, DEGERMAN, KANG & WAIMEY

(57) ABSTRACT

Disclosed is a display stand, including a moving unit configured to extend in a direction perpendicular to a first link configured to extend from one side of a monitor fixing unit, and an elevating unit including a housing configured to have an elevating hole formed therein so that the moving unit is inserted into the elevating unit therethrough, a support member installed in the housing so that the moving unit is movable in a lengthwise direction of the housing and configured to extend in a direction perpendicular to a floor surface, and friction units configured to surround the support member, to have one surface coupled to the moving unit and a plurality of friction members, and to come into contact with an inner surface of the housing.

15 Claims, 6 Drawing Sheets

(56) References Cited

U.S. PATENT DOCUMENTS

| | | | | |
|---|---|---|---|---|
| 2004/0079858 A1* | 4/2004 | Rudolf | ............... | F16M 11/14 |
| | | | | 248/921 |
| 2015/0014493 A1* | 1/2015 | Wu | ............... | F16M 11/18 |
| | | | | 248/125.2 |
| 2015/0366336 A1* | 12/2015 | Wong | ............... | F16M 11/38 |
| | | | | 248/371 |
| 2023/0024561 A1* | 1/2023 | Lee | ............... | F16M 11/42 |

FOREIGN PATENT DOCUMENTS

| | | |
|---|---|---|
| KR | 1020050040043 | 5/2005 |
| KR | 100639180 | 10/2006 |
| KR | 2020090001634 | 2/2009 |
| KR | 10-1228324 | 1/2013 |
| KR | 10-1803722 | 12/2017 |

OTHER PUBLICATIONS

Korean Intellectual Property Office Application No. 10-2022-0008587, Office Action dated Apr. 25, 2023, 4 pages.
Korean Intellectual Property Office Application No. 10-2022-0008587, Notice of Allowance dated Sep. 7, 2023, 2 pages.

\* cited by examiner

DISPLAY STAND

CROSS-REFERENCE TO THE RELATED APPLICATION

Pursuant to 35 U.S.C. § 119(a), this application claims the benefit of earlier filing date and right of priority to Korean Patent Application No. 10-2022-0008587, filed on Jan. 20, 2022, the contents of which are hereby incorporated by reference herein in its entirety.

BACKGROUND OF THE INVENTION

1. Field of the Invention

The present disclosure relates to a display stand, and more particularly to a display stand which may adjust the height of a display and may fix the position of the display.

2. Description of the Related Art

In general, interest in miniaturization, thin thickness and high quality trends of display devices, i.e., transmission media of image information which is important in the information age, is being increased, and thereby, flat panel display devices as substitutes for cathode-ray tube (CRT) displays having a great volume are being developed and distributed.

Among these flat panel display devices, LCD monitors are widely used in recent times, and the LCD monitors display information on a liquid crystal panel depending on a signal input from the outside.

Here, a hinge structure for adjusting the angle of an LCD monitor depending on a user's eye level may be formed at the rear part of the LCD monitor, and most hinge structures are configured such that a highly elastic spring is installed on a shaft so as to adjust the angle of the LCD monitor using elastic force.

As another example, a plurality of circular special disc plates may be installed to overlap each other, and may be pressed in the axial direction, so as to adjust the angle of an LCD monitor using frictional force between the disc plates.

However, when the above-described structure is used for a long time, difficulty in adjusting torque and reduction in frictional force hinder support of the LCD monitor, an improper rotation angle between the LCD monitor and a support requires an unnecessary space to effectively package a product, thereby increasing manufacturing costs and weakening competitiveness among companies in the same line of business.

SUMMARY OF THE INVENTION

Therefore, the present disclosure has been made in view of the above problems, and it is an object of the present disclosure to provide a display stand which has a support member elevated and lowered by a gas spring. The present disclosure further provides a display stand which selectively couples a plurality of rollers and friction units to the gas spring, so as to easily adjust the height of a monitor and to fix the position of the monitor. The present disclosure further provides a display device including the display stand and a display coupled to the display stand.

In accordance with one aspect of the present disclosure, in order to achieve the above and other objects, an a display stand may include: a display fixing unit; a first link extending from the display fixing unit; and a support member which is opposite to the display fixing unit with respect to the first link, and to which the first link is coupled, wherein the support member comprises: a first shaft extending in a direction intersecting a longitudinal direction of the first link; and a second shaft extending in a longitudinal direction of the first shaft, movable along the first shaft, and to which the first link is coupled.

In accordance with another aspect of the present disclosure, a display device may include: a display fixing unit; a first link 10 extending from the display fixing unit; a support member 320 which is opposite to the display fixing unit with respect to the first link, and to which the first link is coupled; and a rotational coupling unit for connecting the first link and the support member, and the first link may be rotatable about a central axis of the rotational coupling unit.

In accordance with yet another aspect of the present disclosure, a display stand may include: a moving unit configured to extend in a direction perpendicular to a first link configured to extend from one side of a monitor fixing unit configured such that a monitor is fixed thereto; and an elevating unit comprising a housing configured to have an elevating hole formed in an outer surface thereof so that the moving unit is inserted into the elevating unit therethrough, a support member installed in the housing so that the moving unit is movable in a lengthwise direction of the housing and configured to extend in a direction perpendicular to a floor surface, and a friction unit configured to surround the support member, to have one surface coupled to the moving unit and a plurality of friction members configured to protrude outwards from a remaining surface of the friction unit, and to come into contact with an inner surface of the housing so as to increase frictional force with the moving unit in the housing and thus to improve fixing force of the moving unit at a designated position.

In accordance with still another aspect of the present disclosure, a display device may include: a display; and a display stand to which the display is coupled.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Reference will now be made in detail to the exemplary embodiments of the present disclosure, examples of which are illustrated in the accompanying drawings.

Advantages and features of the present disclosure and methods for achieving the same will become apparent from the descriptions of aspects hereinbelow with reference to the accompanying drawings.

However, the present disclosure is not limited to the aspects disclosed herein and may be implemented in various different forms. The aspects are provided to make the description of the present disclosure thorough and to fully convey the scope of the present disclosure to those skilled in the art. It is to be noted that the scope of the present disclosure is defined only by the claims.

Further, in the following description of the present disclosure, a detailed description of known functions and configurations incorporated herein will be omitted when it may make the subject matter of the present disclosure rather unclear.

Figure 1:
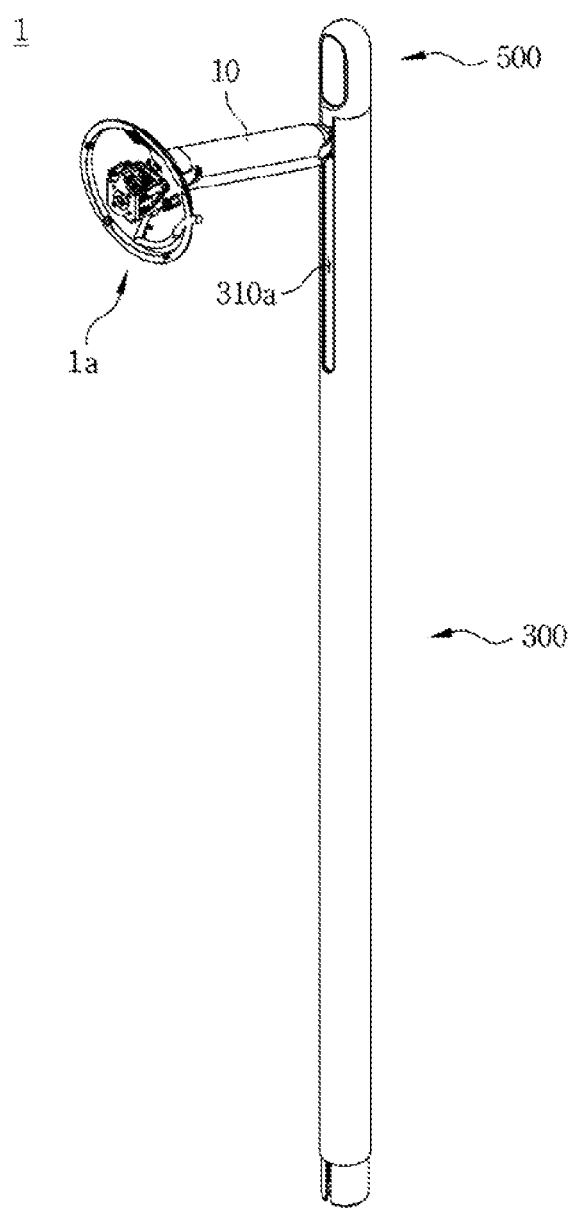
FIG. 1 is a perspective view of a display stand according to one embodiment of the present disclosure.
Figure 2:
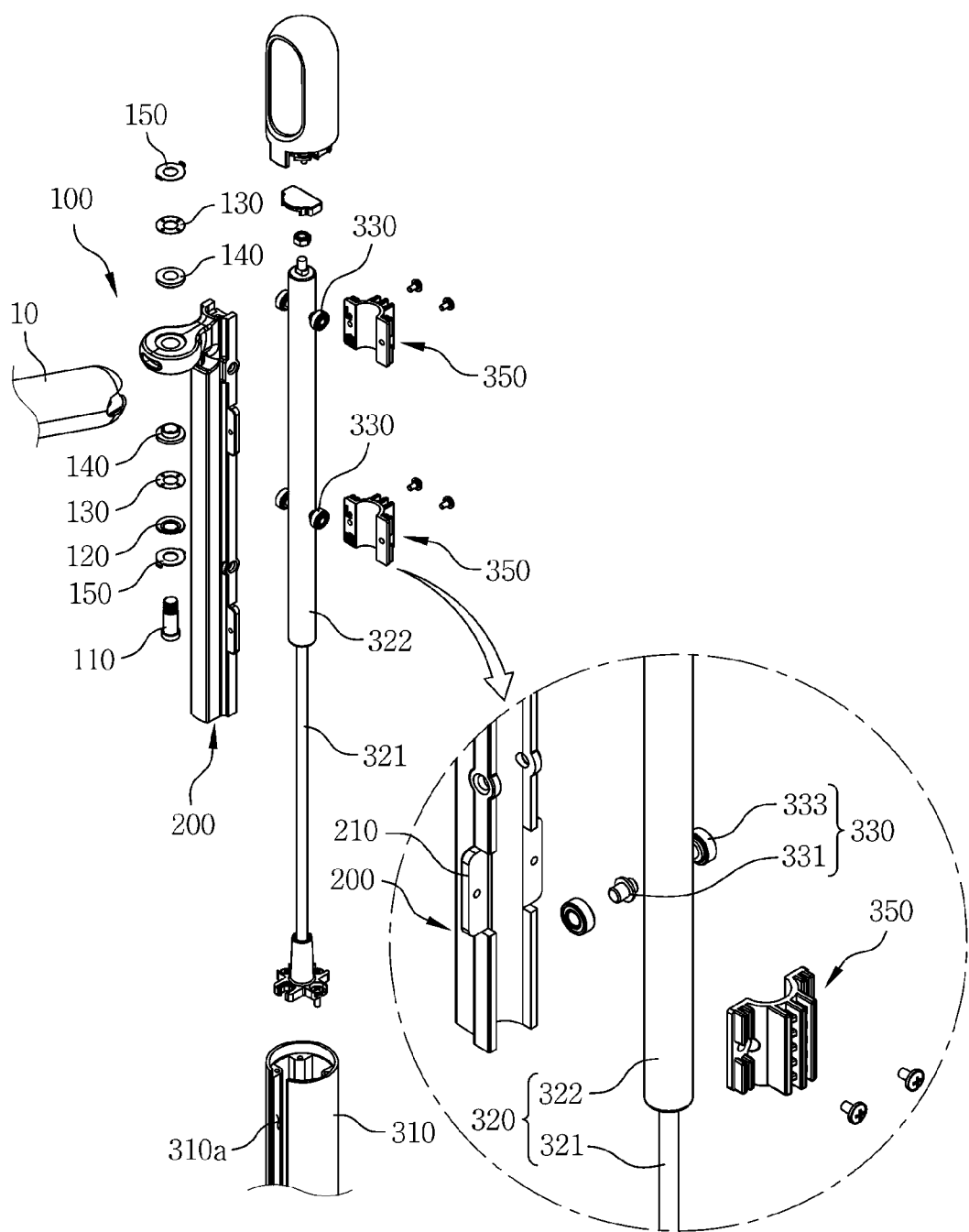
FIG. 2 is an exploded perspective view of the display stand according to one embodiment of the present disclosure.
Figure 3:
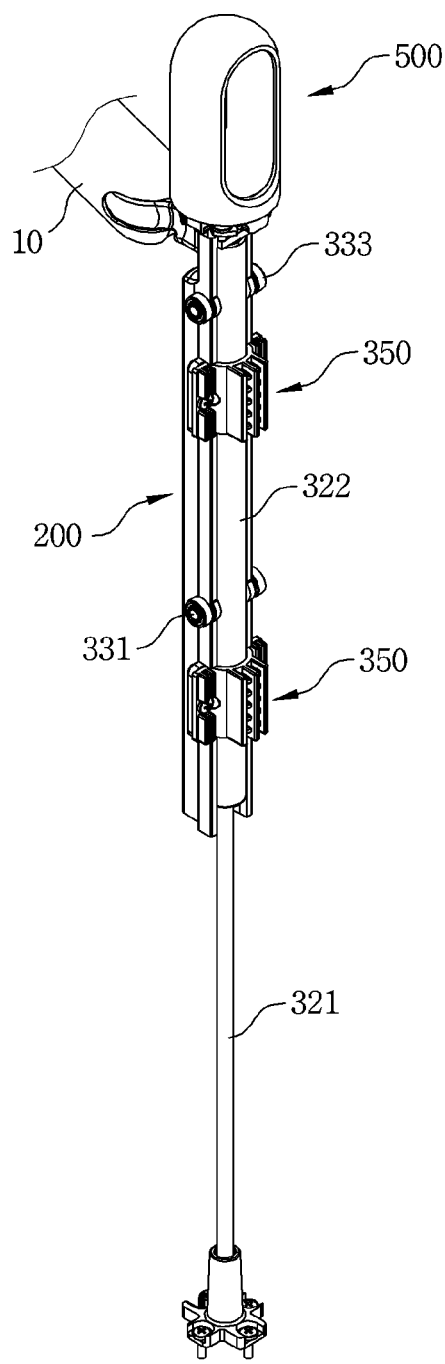
FIG. 3 is a perspective view of the display stand according to one embodiment of the present disclosure, from which a housing is separated.
Figure 4:
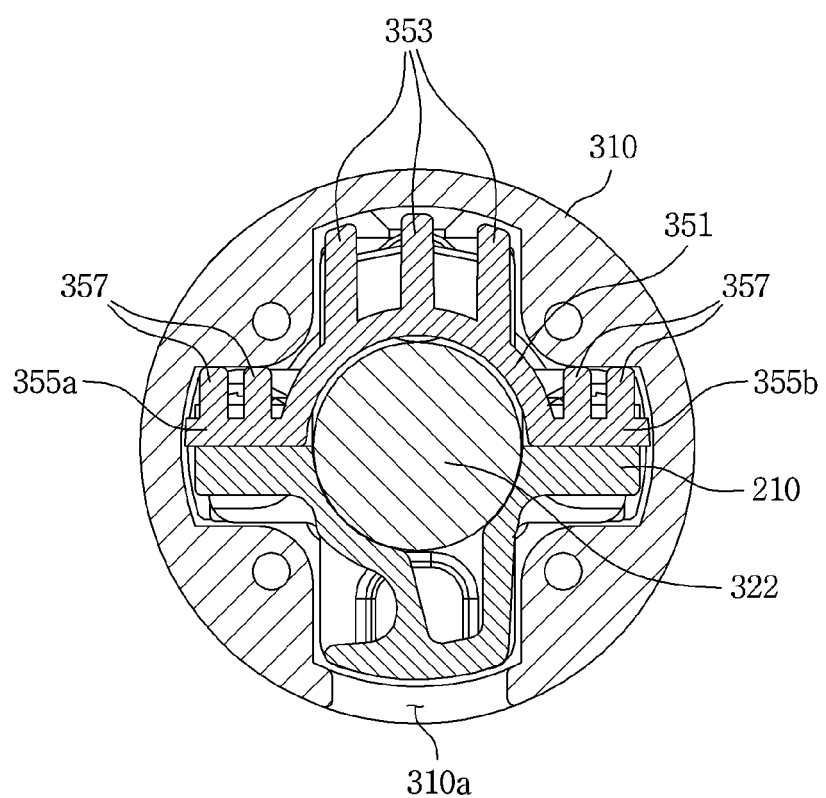
FIG. 4 is a cross-sectional view of the display stand according to one embodiment of the present disclosure.
Figure 5:
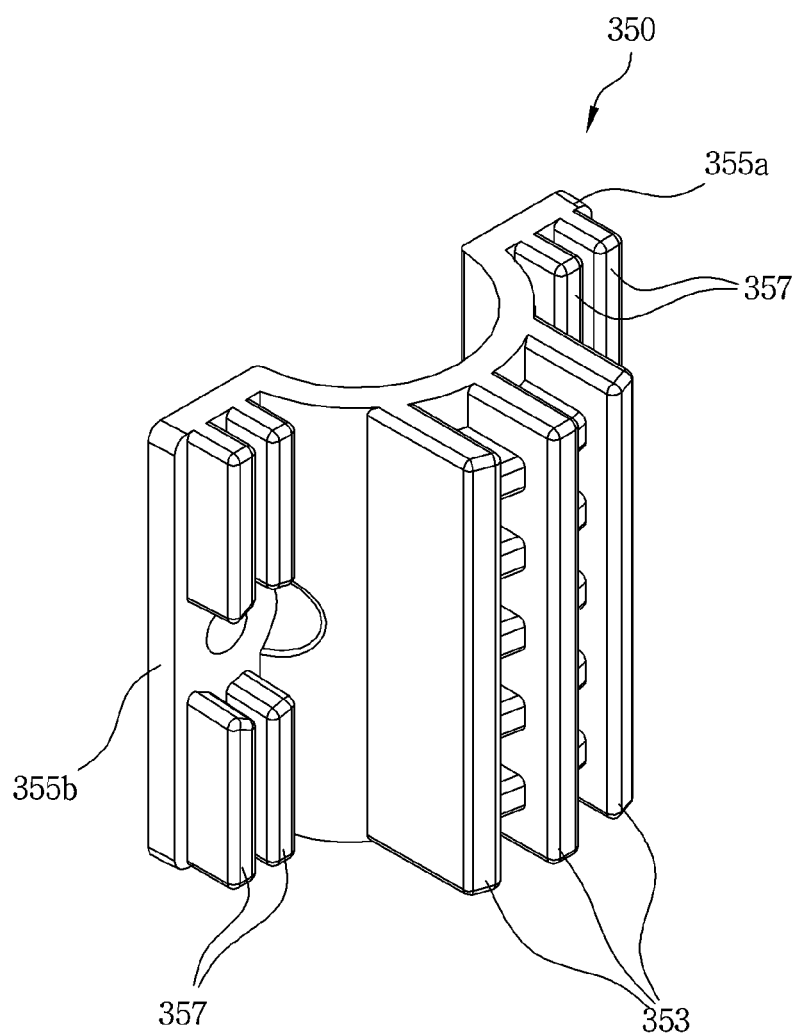
FIG. 5 is a perspective view of a friction unit of the display stand according to one embodiment of the present disclosure.
Figure 6:
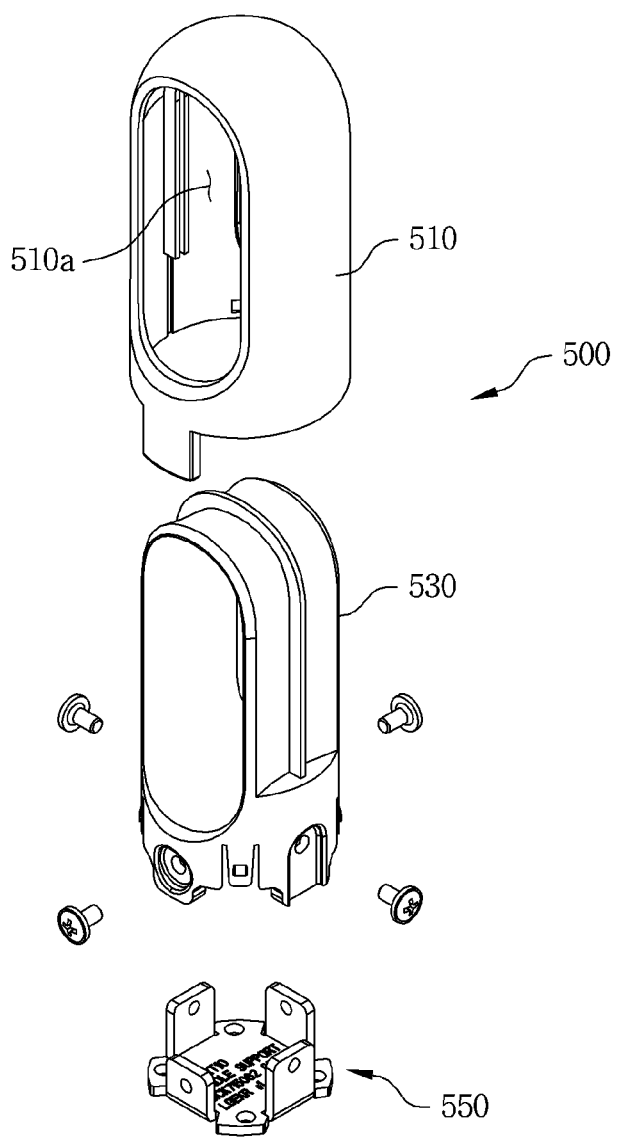
FIG. 6 is an exploded perspective view of a head unit of the display stand according to one embodiment of the present disclosure.

FIG. 1 is a perspective view of a display stand according to one embodiment of the present disclosure, FIG. 2 is an exploded perspective view of the display stand according to one embodiment of the present disclosure, FIG. 3 is a perspective view of the display stand according to one embodiment of the present disclosure, from which a housing is separated, FIG. 4 is a cross-sectional view of the display stand according to one embodiment of the present disclosure, FIG. 5 is a perspective view of a friction unit of the display stand according to one embodiment of the present disclosure, and FIG. 6 is an exploded perspective view of a head unit of the display stand according to one embodiment of the present disclosure.

In FIG. 1, a direction from a first link 10 to an elevating unit 300 is defined as a rearward direction, a direction from the elevating unit 300 to the first link 10 is defined as a forward direction, a direction from the elevating unit 300 to a head unit 500 is defined as an upward direction, and a direction from the head unit 500 to the elevating unit 300 is defined as a downward direction.

Referring to FIGS. 1 to 6, a display stand 1 according to one embodiment of the present disclosure may be configured such that a support elevated and lowered by a gas spring is provided and a plurality of rollers and friction units are selectively coupled to the gas spring so as to easily adjust the height of the display and simultaneously to fix the position of the display, and may include the first link 10, a rotational coupling unit 100, a moving unit 200, the elevating unit 300 and the head unit 500. The display stand 1 may be referred to as a display support 1, a display cradle 1, or an elevating apparatus 1 for supporting a display.

The first link 10 may be installed to be spaced apart from a floor surface. Here, the first link 10 may be coupled to the elevating unit 300 so as to be supported by the floor surface.

Further, a monitor fixing unit 1a, on which the display, such as a monitor, is installed, may be installed at the front end of the first link 10. Further, the rear end of the first link 10 may be connected to the upper end of the moving unit 200. The rear end of the first link 10 may be coupled to the upper end of the moving unit 200 by the rotational coupling unit 100. The monitor fixing unit 1a may be referred to as a display fixing unit 1a or a head 1a. The display may include a display panel such as an OLED panel, an LCD panel, or a LED panel, and may display an image in the front.

Here, the first link 10 may be coupled to the moving unit 200 by the rotational coupling unit 100 such that the first link 10 is rotatable leftwards and rightwards at the upper end of the moving unit 200.

Further, a plurality of rotational coupling units 100 may be coupled as a large number of links are installed, and thus, the plurality of rotational coupling units 100 may be installed on a monitor support (not shown) so that the monitor support may be rotated several times when it is necessary to rotate the monitor support.

That is, the plurality of rotational coupling units 100 is installed depending on the number of links coupled between the monitor fixing unit 1a and the monitor support, and thereby, the monitor fixing unit 1a and the monitor support may be rotated several times.

The rotational coupling unit 100 may be configured to connect the first link 10 and the moving unit 200 so as to rotate the first link 10, which extends from the monitor fixing unit 1a, in the leftward and rightward directions with respect to the monitor support (not shown) having a designated height, and includes a coupling member 110, a first disc spring 120, space washers 130, bushes 140 and toothed lock washers 150. The bush 140 may be a metal bush 140.

The first link 10 may be formed to have a ring-shaped cross-section. Further, the monitor fixing unit 1a may be coupled to the front end of the first link 10.

Further, a hole may be formed in the center of the first link 10 so as to be rotatably coupled to the moving unit 200, and thereby, the coupling member 110 and the metal bushes 140 may be coupled to the first link 10 through the hole.

Here, the hole formed in the center of the first link 10 may be formed in a shape corresponding to the coupling member 110 so that the coupling member 110 may pass through the hole. Further, fixing recesses having a greater diameter than the diameter of the hole into which the coupling member 110 is inserted may be formed in the upper and lower surfaces of the inside of the hole.

Thereby, when the first link 10 and the moving unit 200 are pressed against each other by rotating the coupling member 110, the metal bushes 140 pressed against the inner surface of the first link 10 may be rotated, and the first link 10 pressed against the metal bushes 140 may also be rotated.

Further, a part of the moving unit 200 may protrude in a direction towards the first link 10. Thereby, a transfer opening (not shown) may be formed in the moving unit 200, and the protruding part of the moving unit 200 having the transfer opening is inserted into the first link 10 such that the first link 10 may be coupled to the moving unit 200 so as to be rotatable leftwards and rightwards.

The coupling member 110 passes through both a C-shaped part of the moving unit 200 protruding towards the first link 10 and the first link 10 into which the protruding part of the moving unit 200 is inserted.

Here, the C-shaped protruding part of the moving unit 200 may reduce the weight of a part which is connected to the monitor fixing unit 1a, and may increase the weight of a part which fixes the monitor fixing unit 1a.

That is, the weight of the monitor fixing unit 1a is reduced, and thus, the monitor fixing unit 1a may be easily fixed, and durability of the moving unit 200 which fixes the monitor fixing unit 1a may be improved, thereby being capable of improving durability of monitor fixing members which are formed of plastic or the like.

More particularly, the coupling member 110 has a designated length, and a screw thread is formed on the outer circumferential surface of one end of the coupling member 110 which sequentially passes through one side of the moving unit 200 formed in a C shape and the inside of the first link 10 and is inserted into the other side of the moving unit 200.

Thereby, when the coupling member 110 is rotated to couple the first link 10 to the moving unit 200, the coupling member 110 may be inserted into a coupling hole formed in the other side of the moving unit 200.

This serves to reduce the layout of a hinge structure, in the case in which the coupling member 110 is coupled to the first link 10 and the moving unit 200 using a separate nut, the total length of the rotational coupling unit 100 is increased, and therefore, the other side of the moving unit 200 may serve as a nut so as to achieve structure simplification.

The first disc spring 120 is coupled to the protruding part of the moving unit 200 in the upward direction from below, and is compressed as the coupling member 110 is rotated in a coupling direction, thereby generating axial elastic force.

That is, the first disc spring 120 is a disc-shaped washer formed of an elastic material, and generates rotating torque through repetition of compression and release of compression due to shape characteristics thereof when the first link 10 is rotated leftwards and rightwards.

Here, a plurality of first disc springs 120 may be disposed to overlap each other so as to cause strong axial elastic force, when the coupling member 110 is rotated to couple the first link 10 to the moving unit 200.

The space washers 130 serve to transmit the axial elastic force of the first disc spring 120 to the metal bushes 140, and to guide the metal bushes 140 pressed by the first disc spring 120 so as to rotate the metal bushes 140 in the leftward and rightward directions.

That is to say, since the first disc spring 120 generates elastic force through only the edge thereof due to shape characteristics thereof, the space washers 130 may transmit the elastic force to the metal bushes 140 through the entire area of the space washers 130, and may be rotated between the first disc spring 120 and the metal bushes 140.

That is, when the space washer 130 comes into contact with the coupling member 110 inside the first disc spring 120 so that the rotating force of the coupling member 110 is transmitted to the space washer 130, the space washer 130 comes into contact with the metal bush 140 and thus uniformly transmits the rotating force, distributed on the outwardly protruding part of the first disc spring 120, to the overall area of the metal bush 140, thereby being capable of minimizing abrasion of the inner or outer part of the first disc spring 120 occurring by the rotating force, and improving transmission efficiency of the rotating force.

In the case in which the space washer 130 is omitted, the first disc spring 120 comes into direct contact with the metal bush 140, and thus, when the first link 10 is repeatedly rotated to adjust the angle thereof, the metal bush 140 may be damaged due to abrasion caused by friction, may cause noise, and may thus cause difficulty in normally adjust the angle of the first link 10. Therefore, the space washer 130 is disposed between the first disc spring 120 and the metal bush 140 so as to prevent the above problem.

Here, a pair of space washers 130 is provided, and is disposed to face a pair of metal bushes 140 located in upper and lower regions.

The metal bush 140 located in the upper region may have a reversed L-shaped outer cross-section so as to be fixed to the upper fixing recess in the first link 10, and may be formed of a metal material so as to have high durability, and the metal bush 140 located in the lower region may have the same cross-section and be formed of the same material as the metal bush 140 located in the upper region so as to be fixed to the lower fixing recess in the first link 10.

Here, the metal bushes 140 may be formed of a material which has higher durability than the first link 10 and the moving unit 200 and generates great frictional force, thereby being capable of increasing fixing force between the first link 10 and the protruding part of the moving unit 200.

The metal bushes 140 are fixed to the fixing recesses formed in the upper and lower parts of the first link 10, and serve to guide the first link 10 so as to axially rotate the first link 10 in the fixed state of the metal bushes 140, and to press the upper and lower parts of the first link 10.

The metal bushes 140 having the above-described structure may guide axial rotation of the first link 10 in the leftward and rightward directions in the state in which the axial elastic force generated by the first disc spring 120 is transmitted to the metal bushes 140, when the coupling member 110 is coupled to the metal bushes 140, thereby enabling the first link 10 to be rotated and to be fixed at the rotated position thereof due to the elastic force transmitted to the metal bushes 140.

The toothed lock washers 150, more particularly, a lower toothed lock washer 150 is disposed between the head part of the coupling member 110 and the first disc spring 120 in the state in which the moving unit 200 is coupled to the first link 10.

Further, engagement members 151 may protrude from parts of the toothed lock washers 150 in a designated direction, and the engagement members 151 may be fixedly inserted into mount recesses (not shown) formed in the protruding part of the moving part 200.

For example, the engagement members 151 of the toothed lock washers 150 are inserted into the mount recesses (not shown) formed in the protruding part of the moving part 200, which protrudes in the direction towards the first link 10, thereby being capable of preventing rotation of the toothed lock washers 150.

That is, the toothed lock washers 150 may serve to prevent the rotating force of the first disc spring 120 from being transmitted to the head part of the coupling member 110 when the metal bushes 140 are rotated in the axial direction, and the engagement members 151 may be fixedly inserted into the mount recesses (not shown) having a shape corresponding to the engagement members 151 and formed in the protruding part of the moving part 200 so as to prevent rotation of the toothed lock washers 150.

That is, in the rotational coupling unit 100 having the above-described structure, when the metal bushes 140 are rotated as the first link 10 reciprocates in the leftward and rightward directions, the space washers 130 are also rotated and thus the rotating force may be transmitted to the first disc spring 120, and, in this state, when the head part of the coupling member 110 comes into contact with the first disc spring 120, the coupling member 110 may be loosened due to the transmitted rotating force in the event of repeated rotation of the metal bushes 140.

In order to solve the above problem, the toothed lock washers 150, more particularly, the lower toothed lock washer 150 is disposed between the head part of the coupling member 110 and the first disc spring 120, causes idling of the first disc spring 120 when the metal bushes 140 are rotated based on the rotation of the first link 10, and may thus prevent the rotating force of the first disc spring 120 from being transmitted to the coupling member 110.

For this purpose, the toothed lock washers 150 may have a through hole formed at the centers thereof so that the coupling member 110 may pass therethrough, in the same manner as the first disc spring 120, the space washers 130 and the metal bushes 140, and may include the engagement members 151 protruding upwards or downwards, and the positions of the toothed lock washers 150 may be fixed by mounting the engagement members protruding upwards or downwards in the mount recesses (not shown) in the moving unit 200.

As described above, the toothed lock washers 150 may prevent the rotating force of the first disc spring 120 from being transmitted to the coupling member 110 through fixation of the toothed lock washers 150 to the moving unit 200, and may transmit pressing force, generated by coupling of the coupling member 110, to the first disc spring 120 so as to generate axial elastic force.

These toothed lock washers 150 are provided in a pair, and the toothed lock washer 150 disposed above the first link 10 is disposed above the space washer 130 disposed to be rotatable against the metal bush 140, which presses the upper part of the first link 10.

Thereby, the toothed lock washers 150, more particularly, the toothed lock washer 150 disposed above the first link 10 may prevent contact between the spacer washer 130 and the protruding part of the moving unit 200 having the coupling hole (not shown) provided such that the coupling member 110 is coupled thereto, and may thus prevent abrasion of the protruding part of the moving unit 200 when the space washer 130 is rotated by the rotating force transmitted by the metal bush 140 located in the upper region.

That is, when the metal bush 140 located above the first link 10 and the corresponding space washer 130 may be repeated rotated by repeated rotation of the first link 10, the moving unit 200, which comes into direct contact with the metal bush 140 and the space washer 130, may be abraded due to characteristics of the material of the moving unit 200, and, in order to solve this problem, the toothed lock washer 150 may be fixedly disposed between the corresponding space washer 130 and the other side of the moving unit 200.

Therefore, the toothed lock washers 150 according to one embodiment of the present disclosure are provided in a pair, and prevent rotating force from being directly transmitted to the coupling member 110 and the other side of the moving unit 200, thereby being capable of preventing the coupling member 110 from being loosened and preventing the other side of the moving unit 200 from being abraded.

The elevating unit 300 according to one embodiment of the present disclosure may be configured to move the moving unit 200 upwards and downwards along the elevating unit 300 in the state in which the first link 10 is coupled to the moving unit 200 by the rotational coupling unit 100 so as to be rotatable leftwards and rightwards, and may include a housing 310, a support member 320, fixing units 330, and friction units 350, so as to fix the first link 10 at a position desired by a user. The housing 310 may be formed to have a ring-shape cross-section. Further, an elevating hole 310a may be formed through the housing 310 so as to determine the movement range of the moving unit 200 when the moving unit 200 is inserted into the housing 310 and is moved upwards and downwards.

The elevating hole 310a is formed through one surface of the housing 310 in the lengthwise direction of the housing 310, a part of the moving unit 200 coupled to the inside of the housing 310 may protrude towards the first link 10, as described above, and the protruding part of the moving unit 200 may protrude outwards from the elevating hole 310a so as to be coupled to the first link 10, and may be caught by the housing 310 at the lower end of the elevating hole 310 so that the moving unit 200 may be stopped. Thereby, the downward movement of the moving unit 200 may be limited. Here, the support member 320 coupled to the moving unit 200 may be installed in the housing 310.

The support member 320 may be installed perpendicular to the floor surface. Further, the support member 320 may be a gas spring. Further, the support member 320 may be supported by the floor surface, and may include a first shaft 321 and a second shaft 322, so that the support member 320 may be supported by the floor surface when the moving unit 200 is moved upwards and downwards.

The first shaft 321 may be formed in a cylindrical shape. Further, a prop member (not shown) may be installed at the lower end of the first shaft 321 so that the first shaft 321 may be fixed to the floor surface. Further, the first shaft 321 may extend in a direction perpendicular to the floor surface. Here, the second shaft 322 having a greater diameter than the first shaft 321 may be coupled to the upper part of the first shaft 321.

The second shaft 322 may be formed to have a ring-shaped cross-section. Further, the second shaft 322 may extend in the same direction as the first shaft 321. Thereby, the length of the support member 320 may be adjusted by inserting the first shaft 321 into the second shaft 322.

Further, the moving unit 200 may be installed to surround half of the second shaft 322.

Therefore, a moving body 210 of the moving unit 200 may be moved upwards and downwards together with the second shaft 322, and thereby, the moving unit 200 may be elevated and lowered.

For example, as the first shaft 321 is inserted into or withdrawn from the shaft 322, when the moving unit 200 coupled to the outer surface of the second shaft 322 is moved upwards or downwards, the first link 10 and the rotational coupling unit 100 coupled to the moving body 210 may also be moved upwards or downwards.

Thereby, the moving unit 200 may be elevated and lowered. Here, the second shaft 322 and the moving unit 200 may be fixed to each other by the fixing units 330.

Each of the fixing units 330 may include a fixing shaft 331 and a bearing 333 so as to facilitate movement of the moving body 210 when the moving body 210 is moved upwards and downwards in the housing 310. Further, the fixing units 330 may be provided in pairs, and a plurality of the fixing units 330 may be installed on the outer surface of the moving body 210 so as to be spaced apart from each other. The fixing shafts 331 of the fixing units 330 may be formed to have a ring-shaped cross-section. Further, the fixing shafts 331 may be provided in pairs. In addition, the fixing shafts 331 may protrude towards the second shaft 322. The parts of the fixing shafts 331 protruding towards the second shaft 322 may be inserted into shaft holes (not shown) formed in the moving body 210. Here, a plurality of shaft protrusions (not shown) may be formed on the outer surfaces of the fixing shafts 331 protruding towards the second shaft 322.

Here, the shaft protrusions may have a semi-circular outer surface. Thereby, the fixing shafts 331 may be inserted into the moving body 210, and may be coupled to the moving unit 200.

Further, the central parts of the fixing shafts 331 may have a greater diameter than the parts of the fixing shafts 331 protruding towards the second shaft 322, and parts of the fixing shafts 331 in the opposite direction to the shaft protrusions may protrude to have a ring-shaped cross-section. Here, the bearings 333 may be coupled to the parts of the fixing shafts 331 protruding in the outward direction of the housing 310.

The bearings 333 may be formed in an oil groove type, and may thus be configured such that fluid, such as oil, flows therein, so as to reduce friction between the bearings 333 and the housing 310 coming into contact with the bearings 333, thereby being capable of facilitating upward and downward movement of the moving body 210. The bearing 333 may be a roller 333. Further, the bearings 333 may be poly-oxy-methylene (POM) rollers, thereby being capable of reducing manufacturing costs.

The friction units 350 may be configured to generate frictional force between the moving unit 200 and the housing 310 in the state in which the moving unit 200 is installed on the outer surface of the second shaft 322, so as to fix the second shaft 322 at a designated position, and each of the friction units 350 may include a friction body 351, a first friction member 353, first friction members 353, wing members 355, and second friction members 357.

The friction body 351 may be installed to surround the remaining half of the second shaft 322 opposite to the front half of the second shaft 322 on which the moving unit 200 is installed. That is, the friction body 351 may be formed to have a semicircular shape.

Further, a hemispherical hole may be formed at the center of the friction body 351, and the friction body 351 may surround the outer surface of the rear part of the second shaft 322 inserted into the hemispherical hole.

For example, referring to FIG. 4, the friction body 351 may be installed on a part of the second shaft 322 opposite to the other part of the second shaft 322 to which the moving unit 200 is coupled. That is, the friction body 351 may be installed on the remaining half of the second shaft 322 opposite to the moving body 210 surrounding the outer surface of the half of the second shaft 322, and may thus surround the outer surface of the remaining half of the second shaft 322. Here, a plurality of the first friction members 353 configured to generate friction with the inner surface of the housing 310 may protrude from the rear surface of the friction body 351.

The first friction members 353 may be formed to have a rectangular cross-section. Further, the rear ends of the first friction members 353 may come into contact with the inner surface of the housing 310. In addition the first friction members 353 may extend in the lengthwise direction in which the friction body 351 extends. Thereby, the friction unit 350 comes into contact with the inner surface of the housing 310, and generates frictional force when the moving body 210 is fixed at the designated position, so as to improve fixing force of the moving body 210.

Further, the first friction members 353 may be provided in plural. Further, the first friction members 353 are formed to be spaced apart from each other, and thereby, when force of a designated strength is applied, internal fluid may pass between the first friction members 353, and thus, the moving body 210 may be moved.

That is, the moving unit 200 may be fixed by the frictional force of the first friction members 353 after the moving body 210 has been moved upwards or downwards by force of the designated strength, and may be moved again when force of the designated strength is applied again. That is, the first friction members 353 may prevent the moving unit 200 from falling due to only the weight of the display fixed to the monitor fixing unit 1a. Further, the wing members 355 may protrude from both sides of the friction body 351.

The wing members 355 may protrude perpendicularly from the friction body 351 in the leftward and rightward directions, so as to correspond to parts of the moving body 210 which protrude leftwards and rightwards. Therefore, the wing members 355 and the moving body 210 may come into contact with each other, and the contact surfaces thereof may be fixedly coupled to each other through screw connection.

That is, the wing members 355 and the protruding parts of the moving body 210 may come into contact with each other outside the second shaft 322, and may be coupled to each other through screw connection, and thus, the friction body 351 and the moving body 210 may be fixed to each other while surrounding the second shaft 322.

Further, the second friction members 357 may protrude from the surfaces of the wing members 355 opposite to the surfaces of the wing members 355 facing the moving body 210. The second friction members 357 may extend in the lengthwise direction in which the friction body 351 extends.

The second friction members 357 may be formed to have a shorter length than the first friction members 353. Thereby, parts of the inner surface of the housing 310 formed to have a circular cross-section may protrude towards the second shaft 322, and thus, durability of the housing 310 may be secured due to increase in the thickness of the housing 310.

Further, the ends of the second friction members 357 may come into contact with the protruding parts of the inner surface of the housing 310, and thus, frictional force between the friction unit 350 and the inner surface of the housing 310 may be increased. The second friction members 357 may be provided in plural, and may be formed to be spaced apart from each other.

Therefore, spaces may be formed between the second friction members 357, and the fluid may flow between the second friction members 357. Thereby, when the moving unit 200 is pressed at force of a designated strength or more, the moving unit 200 may be moved upwards and downwards.

The head unit 500 may be installed on the upper end of the second shaft 322 so as to be fixed to the second shaft 322, and may include a head housing 510, a head body 530 and a head connector 550.

A head hole 510a may be formed in the head housing 510. Here, the head body 530 may be inserted into the head housing 510.

A portion of the upper part of the head body 530 may protrude towards the inside of the head housing 510, and may come into contact with the inner surface of the head housing 510 so that the head body 530 may be fixed to the head housing 510.

Further, a plurality of screw coupling holes 531 may be formed in the lower part of the head body 530. For example, four screw coupling holes 531 may be formed in the front, rear, left and right regions of the lower part of the head body 530. In addition, the head connector 550 may be coupled to the lower part of the head body 530.

Parts of the head connector 550 corresponding to the regions of the head body 530, in which the screw coupling holes 531 are formed, may protrude upwards. Further, the upwardly protruding parts of the head connector 550 may be inserted into the head body 530. Here, screw holes may be formed in the upwardly protruding parts of the head connector 550. Here, the screw holes may be formed at positions of the upwardly protruding parts of the head connector 550 corresponding to the screw coupling holes 531.

Thereby, the head connector 550 inserted into the head body 530 is firmly fixed to the head body 530 by inserting screws into the screw coupling holes 531 of the head body 530 and the screw holes of the upwardly protruding parts of the head connector 550, and thus, fixing force between the head body 530 and the head connector 550 may be improved.

Referring to FIGS. 1 to 6, according to one aspect of the present disclosure, a display stand 1 may include: a display fixing unit 1a; a first link 10 extending from the display fixing unit 1a; and a support member 320 which is opposite to the display fixing unit 1a with respect to the first link 10, and to which the first link 10 is coupled, wherein the support member 320 comprises: a first shaft 321 extending in a direction intersecting a longitudinal direction of the first link 10; and a second shaft 322 extending in a longitudinal direction of the first shaft 321, movable along the first shaft 321, and to which the first link 10 is coupled.

The display stand 1 may further include: a housing 310 extending along the first shaft 321 and the second shaft 322, and surrounding an outer surface of the first shaft 321 and an outer surface of the second shaft 322; and a friction unit 350 fixed to the outer surface of the second shaft 322 and contacting an inner side of the housing 310.

The friction unit 350 may include a plurality of friction members 353 and 357 protruding from the outer surface of the friction unit 350 toward the inner side of the housing 310, contacting the inner side of the housing 310, and spaced apart from each other.

A gap between the plurality of friction members 353 and 357 may be formed along the second shaft 322.

The friction unit 350 may include: a friction body 351 extending along the outer surface of the second shaft 322; and a wing member 355 protruding in a radial direction of the second shaft 322 from an end of the friction body 351, and the plurality of friction members 353 and 357 may include: a first friction member 353 formed at an outer surface of the friction body 351; and a second friction member 357 formed at an outer surface of the wing member 355.

The display stand 1 may further include a moving unit 200 which is positioned between the first link 10 and the second shaft 322 and to which the first link 10 is coupled, the second shaft 322 may be positioned between the moving unit 200 and the friction unit 350, and the wing member 355 may be coupled to the moving unit 200.

The friction unit 350 may include a plurality of friction units 350 spaced apart from each other in a longitudinal direction of the second shaft 322.

The display stand 1 may further include: a housing 310 extending along the first shaft 321 and the second shaft 322, and surrounding an outer surface of the first shaft 321 and an outer surface of the second shaft 322; a moving unit 200 which is positioned between the housing 310 and the second shaft 322 and to which the first link 10 is coupled; and a fixing unit 330 for fixing the moving unit 200 to the second shaft 322, wherein the fixing unit 330 may include a roller 333 having a central axis perpendicular to a moving direction of the second shaft 322 and contacting an inner side of the housing 310.

The roller 333 may have an oil groove formed at an outer circumferential surface of the roller 333 and extending in a circumferential direction of the roller 333.

The fixing unit 330 may include a pair of fixing units 330 opposite to each other with respect to the second shaft 322.

The housing 310 may have an elevating hole 310a formed at the housing 310 and corresponding to a movement path of the moving unit 200.

According to another aspect of the present disclosure, a display device 1 may include: a display fixing unit 1a; a first link 10 extending from the display fixing unit 1a; a support member 320 which is opposite to the display fixing unit 1a with respect to the first link 10, and to which the first link 10 is coupled; and a rotational coupling unit 100 for connecting the first link 10 and the support member 320, and the first link 10 may be rotatable about a central axis of the rotational coupling unit 100.

The display stand 1 may further include: a coupling member 110 extending along the central axis of the rotational coupling unit 100, and coupled to an inner side of the first link 10 through the rotational coupling unit 100; a bush 140 positioned between an outer circumferential surface of the coupling member 110 and an inner circumferential surface of the rotational coupling unit 100, and through which the coupling member 110 passes; and a toothed lock washer 150 positioned between the bush 140 and the inner side of the first link 10, and through which the coupling member 110 passes, wherein the toothed lock washer 150 may include an engagement member 151 which is protruding from the toothed lock washer 150, and which is inserted into a mount recess formed at the inner side of the first link 10.

The display stand 1 may further include: a first disc spring 120 positioned between the bush 140 and the toothed lock washer 150 and through which the coupling member 110 passes, the first disc spring 120 providing an elastic force in an axial direction of the coupling member 110; and a space washer 130 positioned between the bush 140 and the first disc spring 120 and through which the coupling member 110 passes.

The display stand 1 may further include a head unit 500 coupled to the second shaft 322 adjacent to one end of the second shaft 322 farthest from the first shaft 321, and wherein the head unit 500 may include: a head housing 510; a head body 530 positioned inside the head housing 510; and a head connector 550 positioned between the head body 530 and the one end of the second shaft 322, and coupled to the head body 530 by a screw.

According to yet another aspect of the present disclosure, a display stand 1 may include: a moving unit 200 configured to extend in a direction perpendicular to a first link 10 configured to extend from one side of a monitor fixing unit 1a configured such that a monitor is fixed thereto; and an elevating unit 300 comprising a housing 310 configured to have an elevating hole 310a formed in an outer surface thereof so that the moving unit 200 is inserted into the elevating unit therethrough, a support member 320 installed in the housing 310 so that the moving unit 200 is movable in a lengthwise direction of the housing 310 and configured to extend in a direction perpendicular to a floor surface, and a friction unit 350 configured to surround the support member 320, to have one surface coupled to the moving unit 200 and a plurality of friction members 353 and 357 configured to protrude outwards from a remaining surface of the friction unit 350, and to come into contact with an inner surface of the housing 310 so as to increase frictional force with the moving unit 200 in the housing 310 and thus to improve fixing force of the moving unit 200 at a designated position.

The display stand 1 may further include a head unit 500 coupled to one end of the moving unit 200.

The head unit 500 may include: a head housing 510 configured to have a head hole 510a formed in a central part thereof; a head body 530 installed in the head housing 510, and configured to have screw coupling holes 531 formed in an outer surface of the head body 530 in a direction perpendicular to a lengthwise direction of the head housing 510; and a head connector 550 installed at one end of the head body 530, and configured to have screw holes formed at positions corresponding to the screw coupling holes 531 of the head body 530 so as to be coupled to the head body 530.

The elevating unit 300 may further include a plurality of oil groove-type fixing units 330 coupled to an outer surface of the support member 320 and configured to fix the moving unit 200 and the support member 320.

The friction unit 350 may include: a friction body 351 configured to surround the support member 320; and a pair of wing members 355a and 355b configured to extend in a lengthwise direction of the friction body 351 so as to be coupled to the moving unit 200.

The display stand 1 may further include a rotational coupling unit 100, wherein the rotational coupling unit 100 may include: a coupling member 110 installed at a central part of the first link 10 to pass through the first link 10 and the moving unit 200 so as to enable the first link 10 and the moving unit 200 to be rotatable in leftward and rightward directions; a metal bush 140 installed on an outer surface of the coupling member 110 so as to surround the coupling member 110, and inserted into the first link 10 so as to press the first link 10 due to rotation of the coupling member 110; and a toothed lock washer 150 installed on the outer surface of the coupling member 110 so as to surround the coupling member 110, disposed on outer surfaces of the metal bush 140, and configured to have a plurality of engagement members 151 provided towards an inner surface of the first link 10 so as to be pressed against an inner surface of the moving unit 200.

The rotational coupling unit 100 may further include a first disc spring 120 installed between a corresponding one of the metal bush 140 and a corresponding one of the toothed lock washer 150 so as to generate axial elastic force depending on rotation of the coupling member 110 in a coupling direction; and a space washer 130 installed between the first disc spring 120 and the corresponding one of the metal bush 140 so as to transmit the axial elastic force of the first disc spring 120.

A through hole may be formed in a central part of the toothed lock washer 150 so that the coupling member 110 passes through the through hole, and the engagement members 151 configured to extend from both ends of the toothed lock washer 150 may be inserted into mount recesses formed in the first link 10.

The metal bush 140 may include: an upper metal bush configured to have a reversed L-shaped cross-section so as to be fixed to a fixing recess formed in an upper part of the first link 10; and a lower metal bush configured to have the same cross-section as the upper metal bush so as to be fixed to a fixing recess formed in a lower part of the first link 10.

According to still another aspect of the present disclosure, a display device may include: a display; and a display stand 1 to which the display is coupled.

As described above, the first link 10 and the moving unit 200 according to one embodiment of the present disclosure may implement rotation of the monitor fixing unit leftwards and rightwards through the rotational coupling unit 100, and, when downward force from the top is applied to the monitor fixing unit or when upward force from the bottom is applied to the monitor fixing unit, the moving unit 200 connected to the monitor fixing unit may be moved downwards or upwards in the housing 310, and may thus determine the height of the monitor fixing unit. Here, the friction units 350, each of which includes a plurality of first friction members 353 and a plurality of second friction members 357, are provided on the outer surface of the second shaft 322 in the housing 310, and generate frictional force at a designated position, thereby being capable improving the fixing force of the display at the designated position.

Further, the rotational coupling unit 100 according to one embodiment of the present disclosure generates rotating torque in the leftward and rightward directions through coupling of the disc spring 120 in a hinge structure in which a plurality of washers and bushes are coupled to the coupling member 110 serving as a rotating shaft, thereby being capable of adjusting and fixing the angle of the monitor.

In addition, the rotational coupling unit 100 according to the present disclosure includes the toothed lock washers 150, thereby being capable of preventing the coupling member 110 from being loosened in the hinge structure even when the angle the monitor is repeatedly adjusted.

As is apparent from the above description, the present disclosure provides a display stand, which has a support elevated and lowered through a gas spring, and selectively couples a plurality of rollers and resistance members to the gas spring, so as to easily adjust the height of the display and simultaneously to fix the position of the display. Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A display stand, comprising:
a display fixing unit;
a first link extending long and having a first end coupled to the display fixing unit;
a housing positioned adjacent to a second end of the first link and extending in a direction intersecting a longitudinal direction of the first link;
a first shaft positioned inside the housing and extending in a longitudinal direction of the housing;
a second shaft positioned inside the housing, extending in a longitudinal direction of the first shaft, and movable along the first shaft;
a moving unit which surrounds a portion of an outer surface of the second shaft and to which the second end of the first link is coupled; and
a friction unit coupled to the moving unit and positioned opposite to the moving unit with respect to the second shaft,
wherein the friction unit contacts an inner surface of the housing.

2. The display stand of claim 1,
wherein the housing comprises protruding portions protruding from the inner surface of the housing and spaced apart from each other, and
wherein the friction unit is inserted between the protruding portions to contact the inner surface of the housing.

3. The display stand of claim 1, wherein the friction unit comprises a plurality of friction members protruding from an outer surface of the friction unit toward the inner surface of the housing to contact the inner surface of the housing, and spaced apart from each other.

4. The display stand of claim 3, wherein a gap between the plurality of friction members is formed along the second shaft.

5. The display stand of claim 3, wherein the friction unit comprises:
a friction body extending along the outer surface of the second shaft; and
a wing member protruding in a radial direction of the second shaft from an end of the friction body, and
wherein the plurality of friction members comprises:
a first friction member formed at an outer surface of the friction body; and
a second friction member formed at an outer surface of the wing member.

6. The display stand of claim 5,
wherein the wing member is coupled to the moving unit.

7. The display stand of claim 1, wherein the friction unit comprises a plurality of friction units spaced apart from each other in a longitudinal direction of the second shaft.

8. The display stand of claim 1, further comprising
a roller positioned between the moving unit and the housing and rotatably coupled to the moving unit, and
wherein the roller has a central axis perpendicular to a moving direction of the second shaft and contacts the inner surface of the housing.

9. The display stand of claim 8, wherein the roller has an oil groove formed at an outer circumferential surface of the roller and extending in a circumferential direction of the roller.

10. The display stand of claim 8, wherein the roller comprises a pair of rollers opposite to each other with respect to the second shaft.

11. The display stand of claim 8, wherein the housing has an elevating hole formed at the housing and corresponding to a movement path of the moving unit.

12. The display stand of claim 1, further comprising a rotational coupling unit for connecting the first link and the second shaft, and
wherein the first link is rotatable about a central axis of the rotational coupling unit.

13. The display stand of claim 12, further comprising:
a coupling member extending along the central axis of the rotational coupling unit, and coupled to an inner side of the first link through the rotational coupling unit;
a bush positioned between an outer circumferential surface of the coupling member and an inner circumferential surface of the rotational coupling unit, and through which the coupling member passes; and
a toothed lock washer positioned between the bush and the inner side of the first link, and through which the coupling member passes,
wherein the toothed lock washer comprises an engagement member which is protruding from the toothed lock washer, and which is inserted into a mount recess formed at the inner side of the first link.

14. The display stand of claim 13, further comprising:
a first disc spring positioned between the bush and the toothed lock washer and through which the coupling member passes, the first disc spring providing an elastic force in an axial direction of the coupling member; and
a space washer positioned between the bush and the first disc spring and through which the coupling member passes.

15. A display device, comprising:
a display; and
a display stand of claim 1 to which the display is coupled.

* * * * *